US012386756B2

(12) United States Patent
Raff et al.

(10) Patent No.: US 12,386,756 B2
(45) Date of Patent: Aug. 12, 2025

(54) SYSTEM AND METHOD FOR MANAGING METADATA ACCESS LOCKING IN CACHE

(71) Applicant: Dell Products L.P., Round Rock, TX (US)

(72) Inventors: Jason E. Raff, Bedford, NH (US); Socheavy D. Heng, Framingham, MA (US); Vikram A. Prabhakar, Apex, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/464,797

(22) Filed: Sep. 11, 2023

(65) Prior Publication Data
US 2025/0086120 A1    Mar. 13, 2025

(51) Int. Cl.
*G06F 12/109* (2016.01)
*G06F 12/1081* (2016.01)

(52) U.S. Cl.
CPC ........ *G06F 12/109* (2013.01); *G06F 12/1081* (2013.01); *G06F 2212/657* (2013.01)

(58) Field of Classification Search
CPC .............. G06F 12/1081; G06F 12/109; G06F 2212/656; G06F 2212/657; G06F 2212/7207
USPC ........................................................ 711/203
See application file for complete search history.

(56) References Cited

U.S. PATENT DOCUMENTS

| 5,440,743 | A  | * | 8/1995  | Yokota    | G06F 9/524  |
|           |    |   |         |           | 710/200     |
| 5,832,484 | A  | * | 11/1998 | Sankaran  | G06F 16/2343|
|           |    |   |         |           | 718/107     |
| 8,086,585 | B1 | * | 12/2011 | Brashers  | G06F 16/137 |
|           |    |   |         |           | 707/705     |
| 11,093,169| B1 | * | 8/2021  | Shveidel  | G06F 3/064  |
| 11,620,062| B1 | * | 4/2023  | Shveidel  | G06F 3/064  |
|           |    |   |         |           | 711/154     |
| 2005/0198127 | A1 | * | 9/2005 | Helland   | G06F 9/52   |
|           |    |   |         |           | 709/204     |
| 2008/0168458 | A1 | * | 7/2008 | Fachan    | G06F 9/526  |
|           |    |   |         |           | 718/104     |
| 2015/0317183 | A1 | * | 11/2015| Little    | G06F 16/00  |
|           |    |   |         |           | 707/703     |
| 2017/0031945 | A1 | * | 2/2017 | Sarab     | G06F 16/1748|

(Continued)

*Primary Examiner* — Reginald G Bragdon
*Assistant Examiner* — Aaron D Ho
(74) *Attorney, Agent, or Firm* — Brian J. Colandreo; Heath M. Sargeant; Holland & Knight LLP

(57) ABSTRACT

A method, computer program product, and computing system for receiving a metadata input/output (IO) request on a first storage node of a storage system. The metadata IO request may be partitioned into a plurality of metadata pages. The plurality of metadata pages may include a plurality of logical metadata pages and a plurality of virtual metadata pages. A family identifier may be obtained for each logical metadata page. The family identifier is a unique identifier assigned to a group of related metadata elements that share data, and is stored in a family identifier locking table. At least one of the plurality of metadata pages may be locked from access by a second storage node using the family identifier. The metadata IO request may be processed on the plurality of metadata pages by loading the at least one of the plurality of metadata pages into a memory of the first storage node.

14 Claims, 8 Drawing Sheets

(56) References Cited

U.S. PATENT DOCUMENTS

| | | | |
|---|---|---|---|
| 2018/0004571 A1* | 1/2018 | Accapadi | G06F 11/3055 |
| 2018/0081810 A1* | 3/2018 | King | G06F 9/522 |
| 2020/0151100 A1* | 5/2020 | Mashimo | G06F 12/0862 |
| 2020/0241793 A1* | 7/2020 | Shveidel | G06F 3/0604 |
| 2020/0267082 A1* | 8/2020 | Dong | H04L 63/0227 |
| 2021/0216213 A1* | 7/2021 | Shveidel | H04L 67/1001 |
| 2021/0216531 A1* | 7/2021 | Shveidel | G06F 16/2365 |
| 2022/0197924 A1* | 6/2022 | Chen | G06F 11/2094 |
| 2022/0350787 A1* | 11/2022 | Shveidel | G06F 16/2379 |
| 2023/0106982 A1* | 4/2023 | David | G06F 3/0637 |
| | | | 707/704 |
| 2023/0229332 A1* | 7/2023 | Shveidel | G06F 3/061 |
| | | | 711/153 |

* cited by examiner

SYSTEM AND METHOD FOR MANAGING METADATA ACCESS LOCKING IN CACHE

BACKGROUND

Storing and safeguarding electronic content may be beneficial in modern business and elsewhere. Accordingly, various methodologies may be employed to protect and distribute such electronic content.

For example, in an active/active cache, to maintain data consistency between nodes, data pages (i.e., units at which Logical Block Address (LBA) space is managed) must be locked across cache nodes, so that write and read IO operations are serialized. To do this, the cache sends lock requests and processes lock replies using an Internode Connection Service (ICS). However, the cost (in terms of latency of this internode message) is high compared to the rest of the IO request. To reduce this cost, the cache remembers the last access permission granted to this node for a particular page. This solution works well for IO patterns that produce a majority of cache hits. However, for cache miss-heavy workloads, since the node does not have the new page in memory, it must still send a lock request to its peer node to ensure that the page is not being used.

With conventional approaches, to get around this performance limitation, an Asymmetric Logical Unit access (ALUA) feature is used. A data volume (i.e., a named logical extent with its address space) has a notion of being "owned" by a node. Using ALUA, the initiators are advertised that all IO requests to a volume should be directed to a specific node. Once an IO request has been directed to a particular node, the cache may use the concept of an extent lock, which works similarly to the page lock. Both nodes maintain a table in memory for all the extents in the system indexed by an extent identifier. Data pages are locked as usual, but a lookup is also performed on an extent table using the extent identifier of the data page. If the peer node has not seen an IO request for a particular extent, it may grant a lock not only on the data page, but also for the entire data extent. This information is updated and maintained on the requesting node, and subsequent IO requests on that node for that extent no longer need to send lock requests through ICS to the peer node.

The scheme described above is effective in limiting the need for internode lock requests for data pages, but it is not as effective for metadata pages. This is because volume snapshot and clone operations may result in multiple data volumes sharing the same data, including some of the same metadata pages. Consequently, a single metadata page may belong to multiple extents. As such, the metadata cache must send lock requests across ICS for metadata cache misses.

SUMMARY OF DISCLOSURE

In one example implementation, a computer-implemented method executed on a computing device may include, but is not limited to, receiving a metadata input/output (IO) request on a first storage node of a storage system. The metadata IO request may be partitioned into a plurality of metadata pages. The plurality of metadata pages may include a plurality of logical metadata pages and a plurality of virtual metadata pages. A family identifier may be obtained for each logical metadata page. The family identifier is a unique identifier assigned to a group of related metadata elements that share data and is stored in a family identifier locking table. At least one of the plurality of metadata pages may be locked from access by a second storage node using the family identifier. The metadata IO request may be processed on the plurality of metadata pages by loading the at least one of the plurality of metadata pages into a memory of the first storage node.

One or more of the following example features may be included. Locking the at least one of the plurality of metadata pages may include performing an extent lock table lookup and an extent locking using the family identifier in place of an extent identifier when the family identifier is known. Locking the at least one of the plurality of metadata pages may include performing metadata page locking by sending a lock request and processing a lock reply using an internode connection service (ICS) when the family identifier does not exist. Locking the at least one of the plurality of metadata pages may include performing a cache lookup for the at least one of the plurality of metadata pages by logical block address (LBA) when the family identifier is unknown. Performing the cache lookup for the metadata page by the LBA may include: determining whether the page is loaded in the memory of the first storage node; in response to determining that the page is loaded in the memory of the first storage node, obtaining the family identifier from a metadata memory structure; and in response to determining that the page is not loaded in the memory of the first storage node, reading the at least one of the plurality of metadata pages from persistent storage, and loading the at least one of the plurality of metadata pages to the memory of the first storage node. Obtaining a family identifier for each logical metadata page may include indicating that an associated family identifier does not exist for the plurality of virtual metadata pages. The first and second nodes of the storage system are configured in an active/active configuration.

In another example implementation, a computer program product resides on a computer readable medium that has a plurality of instructions stored on it. When executed by a processor, the instructions cause the processor to perform operations that may include, but are not limited to, receiving a metadata input/output (IO) request on a first storage node of a storage system. The metadata IO request may be partitioned into a plurality of metadata pages. The plurality of metadata pages may include a plurality of logical metadata pages and a plurality of virtual metadata pages. A family identifier may be obtained for each logical metadata page. The family identifier is a unique identifier assigned to a group of related metadata elements that share data and is stored in a family identifier locking table. At least one of the plurality of metadata pages may be locked from access by a second storage node using the family identifier. The metadata IO request may be processed on the plurality of metadata pages by loading the at least one of the plurality of metadata pages into a memory of the first storage node.

One or more of the following example features may be included. Locking the at least one of the plurality of metadata pages may include performing an extent lock table lookup and an extent locking using the family identifier in place of an extent identifier when the family identifier is known. Locking the at least one of the plurality of metadata pages may include performing metadata page locking by sending a lock request and processing a lock reply using an internode connection service (ICS) when the family identifier does not exist. Locking the at least one of the plurality of metadata pages may include performing a cache lookup for the at least one of the plurality of metadata pages by logical block address (LBA) when the family identifier is unknown. Performing the cache lookup for the metadata page by the LBA may include: determining whether the page is loaded in the memory of the first storage node; in response to determining that the page is loaded in the memory of the first storage node, obtaining the family identifier from a metadata memory structure; and in response to determining that the page is not loaded in the memory of the first storage node, reading the at least one of the plurality of metadata pages from persistent storage, and loading the at least one of the plurality of metadata pages to the memory of the first storage node. Obtaining a family identifier for each logical metadata page may include indicating that an associated family identifier does not exist for the plurality of virtual metadata pages. The first and second nodes of the storage system are configured in an active/active configuration.

In another example implementation, a computing system includes at least one processor and at least one memory architecture coupled with the at least one processor, wherein the at least one processor is configured to receive a metadata input/output (IO) request on a first storage node of a storage system. The metadata IO request may be partitioned into a plurality of metadata pages. The plurality of metadata pages may include a plurality of logical metadata pages and a plurality of virtual metadata pages. A family identifier may be obtained for each logical metadata page. The family identifier is a unique identifier assigned to a group of related metadata elements that share data and is stored in a family identifier locking table. At least one of the plurality of metadata pages may be locked from access by a second storage node using the family identifier. The metadata IO request may be processed on the plurality of metadata pages by loading the at least one of the plurality of metadata pages into a memory of the first storage node.

One or more of the following example features may be included. Locking the at least one of the plurality of metadata pages may include performing an extent lock table lookup and an extent locking using the family identifier in place of an extent identifier when the family identifier is known. Locking the at least one of the plurality of metadata pages may include performing metadata page locking by sending a lock request and processing a lock reply using an internode connection service (ICS) when the family identifier does not exist. Locking the at least one of the plurality of metadata pages may include performing a cache lookup for the at least one of the plurality of metadata pages by logical block address (LBA) when the family identifier is unknown. Performing the cache lookup for the metadata page by the LBA may include: determining whether the page is loaded in the memory of the first storage node; in response to determining that the page is loaded in the memory of the first storage node, obtaining the family identifier from a metadata memory structure; and in response to determining that the page is not loaded in the memory of the first storage node, reading the at least one of the plurality of metadata pages from persistent storage, and loading the at least one of the plurality of metadata pages to the memory of the first storage node. Obtaining a family identifier for each logical metadata page may include indicating that an associated family identifier does not exist for the plurality of virtual metadata pages. The first and second nodes of the storage system are configured in an active/active configuration.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

System Overview

Figure 1:
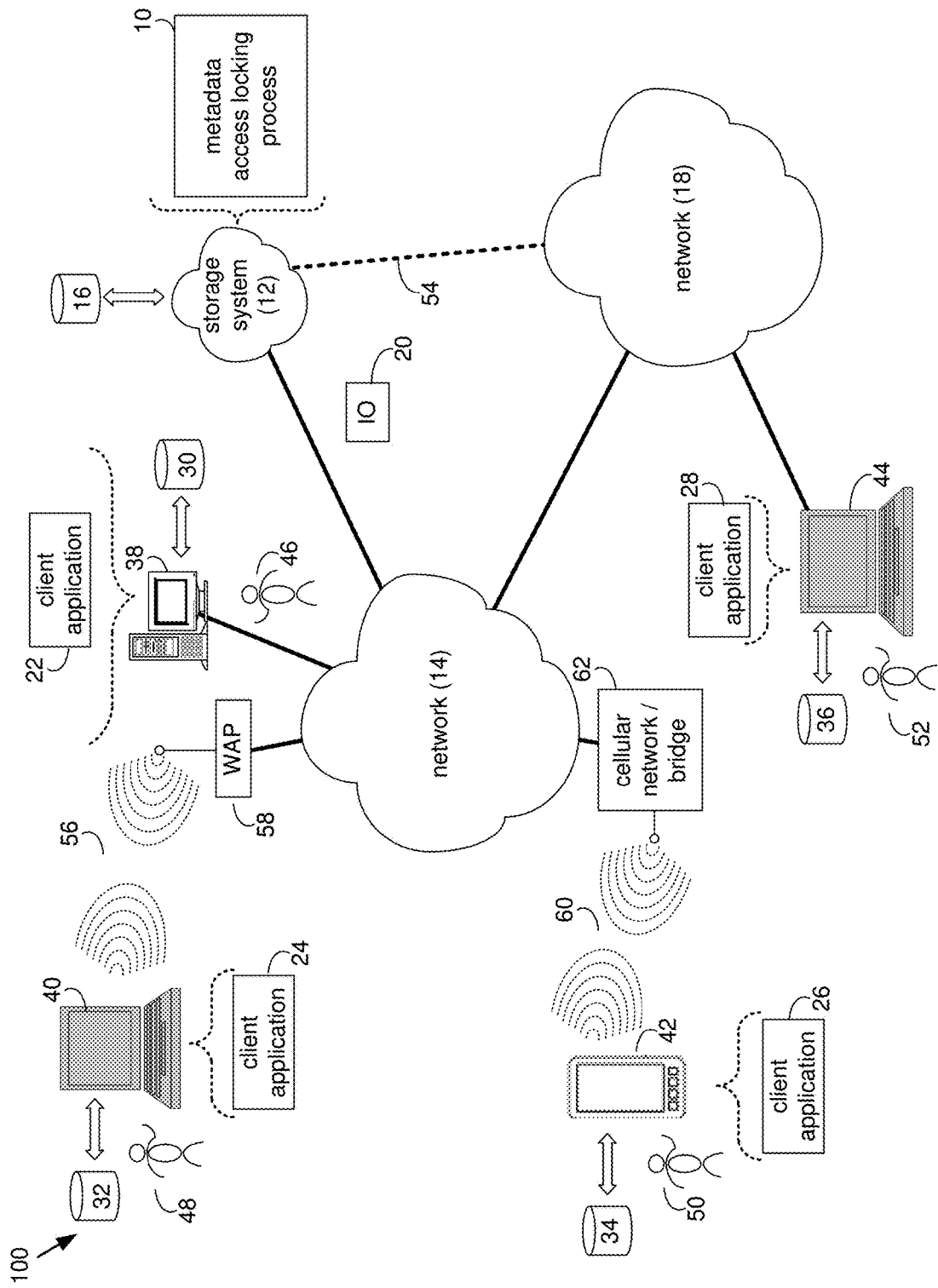
FIG. 1 is an example diagrammatic view of a storage system and a data ownership process coupled to a distributed computing network according to one or more example implementations of the disclosure.

Referring to FIG. 1, there is shown metadata access locking process 10 that may reside on and may be executed by storage system 12, which may be connected to network 14 (e.g., the Internet or a local area network). Examples of storage system 12 may include but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device, and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata access locking process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of metadata access locking process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata access locking process, such as metadata access locking process 10 of FIG. 1, may include but is not limited to, receiving a metadata input/output (IO) request on a first storage node of a storage system. The metadata IO request may be partitioned into a plurality of metadata pages. The plurality of metadata pages may include a plurality of logical metadata pages and a plurality of virtual metadata pages. A family identifier may be obtained for each logical metadata page. The family identifier is a unique identifier assigned to a group of related metadata elements that share data and is stored in a family identifier locking table. At least one of the plurality of metadata pages may be locked from access by a second storage node using the family identifier. The metadata IO request may be processed on the plurality of metadata pages by loading the at least one of the plurality of metadata pages into a memory of the first storage node.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
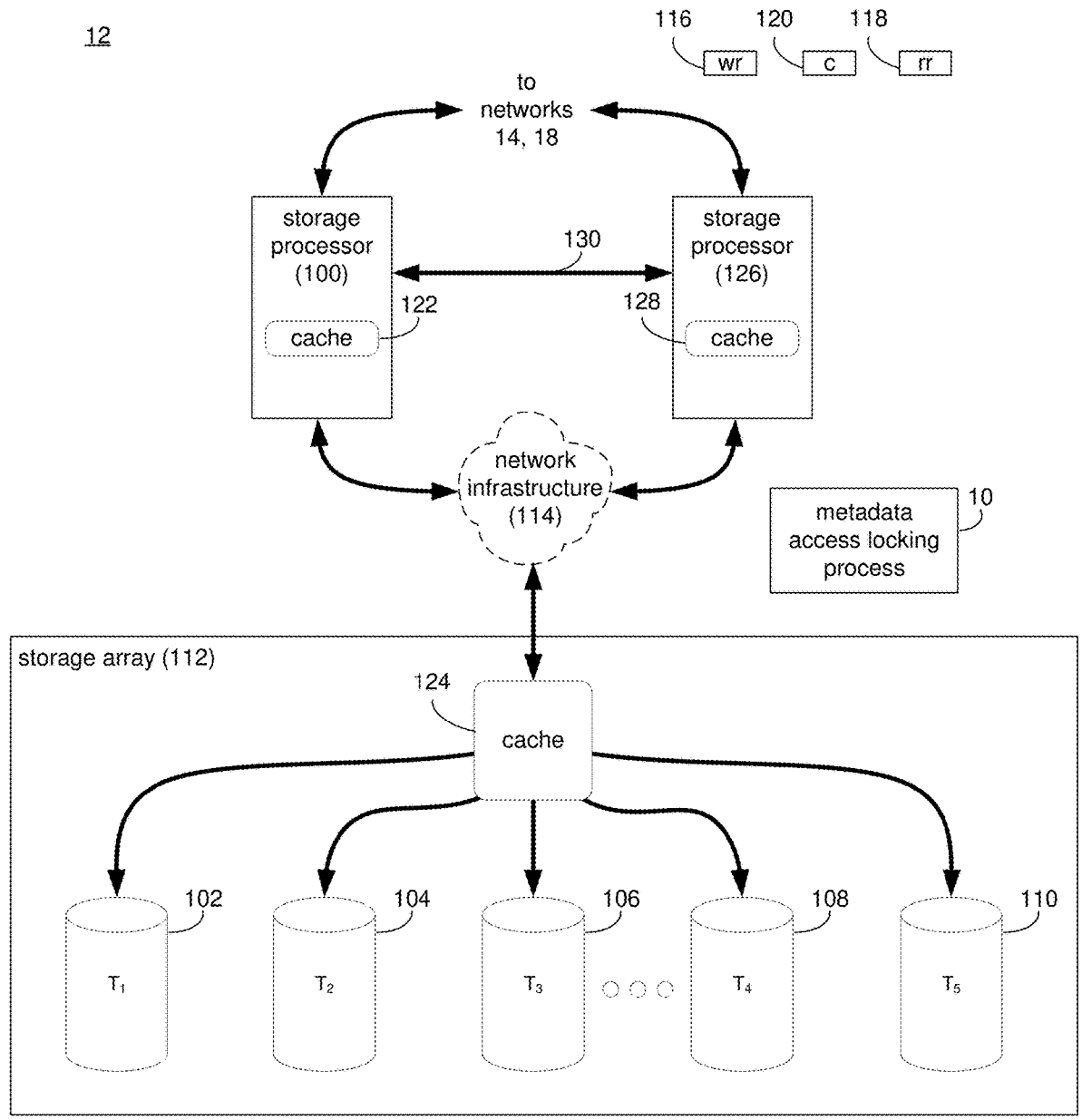
FIGS. 2-3 are example diagrammatic views of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g., storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata access locking process 10. The instruction sets and subroutines of metadata access locking process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of metadata access locking process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of metadata access locking process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata access locking process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of metadata access locking process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of metadata access locking process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the LBA space address from the physical one. This is done by leveraging a multi-layer architecture.

Figure 3:
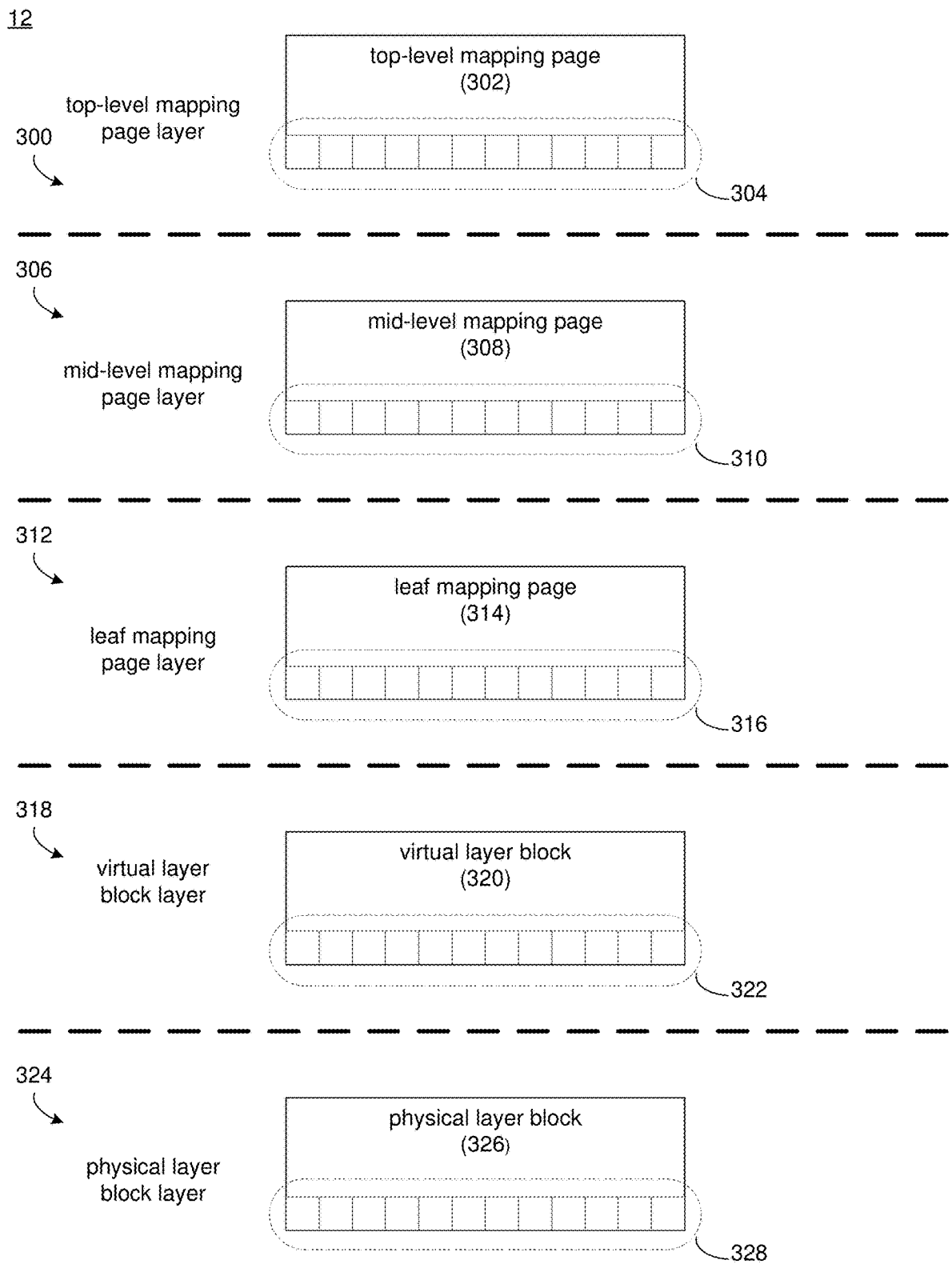
Figure 4A:
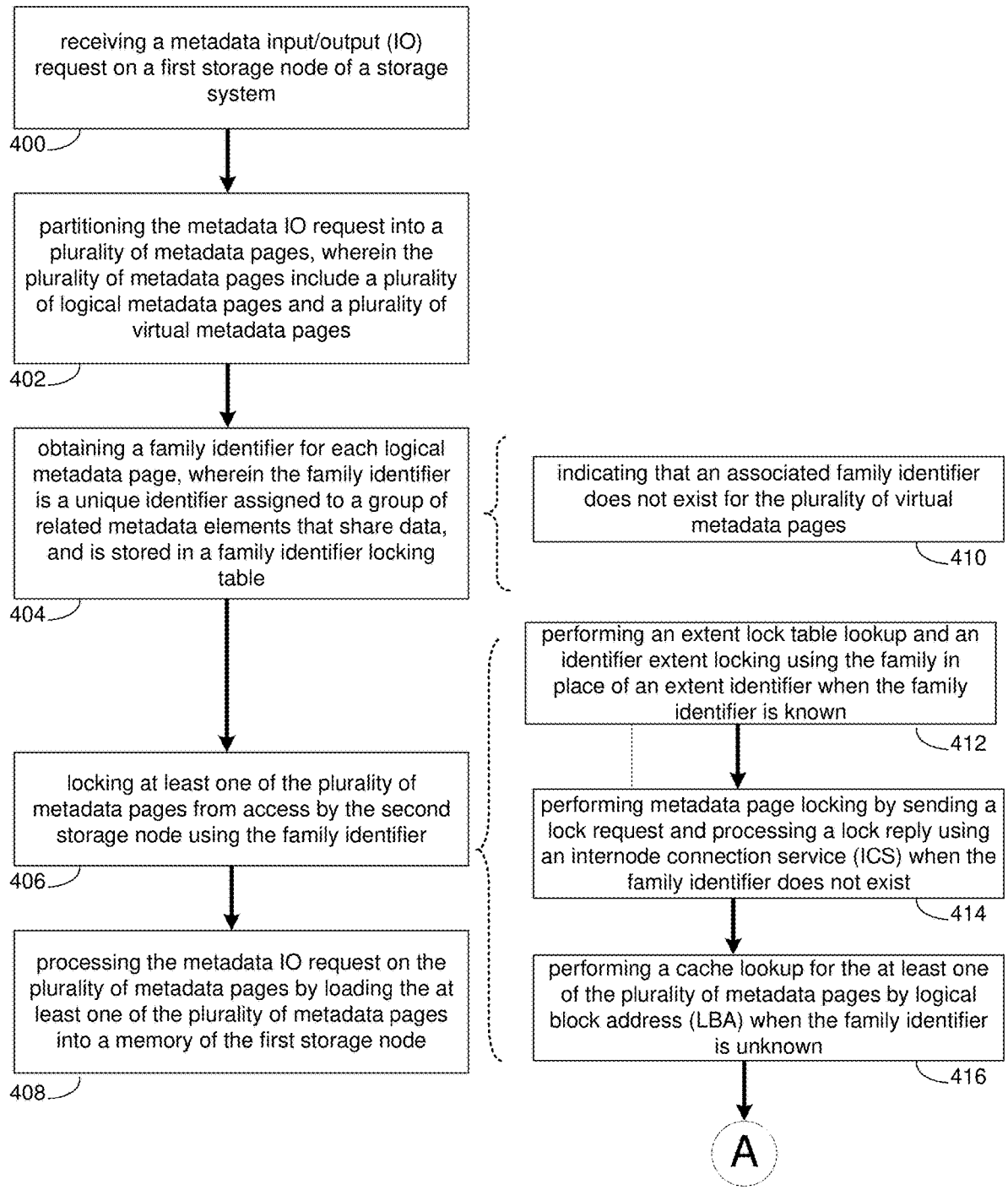
FIGS. 4A-4B are example flowcharts of the metadata access locking process of FIG. 1 according to one or more example implementations of the disclosure.
Figure 4B:
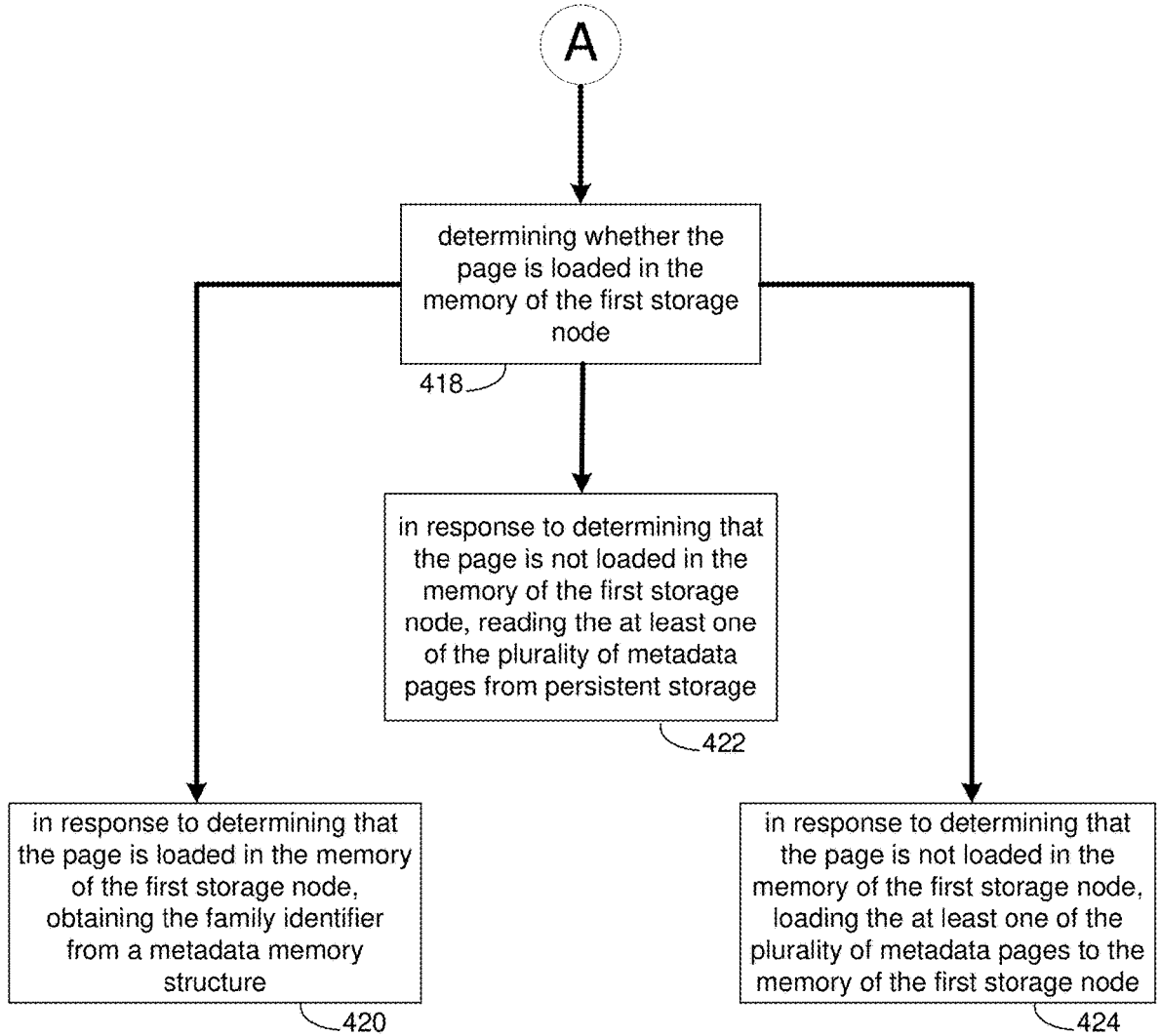

Referring also to FIG. 3, a storage system may generally include a mapper layer which is structured as a file system with various layers of pages and blocks. In some implementations, the combination of various metadata layers mapper layers may be referred to as a mapper metadata tree. While the following example includes metadata "blocks," it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold mapping of a LBA to a virtual layer block. It will be appreciated that other data structures may be used within the scope of the present disclosure to organize the first layer.

In some implementations, a virtual layer block layer (e.g., second layer 318) may include virtual layer blocks (e.g., virtual layer block 320) with a plurality of entries (e.g., plurality of entries 322) that map to a plurality of entries of one or more physical data blocks. The virtual layer block layer (e.g., virtual layer block layer 318) may generally isolate the logical address of a block from the physical location of the block. For example, a virtual layer block (e.g., virtual layer block 308) may encapsulate the physical location of user data and allow relocation without updating leaf mapping pages (e.g., leaf mapping page 314). Accordingly, the virtual layer block layer (e.g., virtual layer block layer 318) may decouple the Logical Block Address space address from the physical one.

In some implementations, a physical data block layer (e.g., physical data block layer 324) may include physical data blocks (e.g., physical data block 326) with a plurality of entries or portions (e.g., plurality of entries 328) that are configured to store user data. In this manner, physical data block layer 324 may describe the physical location of user data in a storage system. In some implementations, each physical data block (e.g., physical data block 326) may have a predefined amount of storage capacity for storing data (e.g., user data).

The Metadata Access Locking Process

Referring also to FIGS. 4A-7 and in some implementations, metadata access locking process 10 may receive a metadata input/output (IO) request 400 on a first storage node of a storage system. The metadata IO request may be partitioned 402 into a plurality of metadata pages. The plurality of metadata pages may include a plurality of logical metadata pages and a plurality of virtual metadata pages. A family identifier may be obtained 404 for each logical metadata page. The family identifier is a unique identifier assigned to a group of related metadata elements that share data and is stored in a family identifier locking table. At least one of the plurality of metadata pages may be locked 406 from access by a second storage node using the family identifier. The metadata IO request may be processed 408 on the plurality of metadata pages by loading the at least one of the plurality of metadata pages into a memory of the first storage node.

In some implementations, metadata access locking process 10 may address the need for a more efficient and an effective method of limiting internode lock requests in metadata cache for cache misses. For example, in an active/active cache, to maintain data consistency between nodes, data pages (i.e., units at which the LBA space is managed) must be locked across cache nodes, so that write and read IO operations are serialized. To do this, the cache sends lock requests and processes lock replies using an internode connection service (ICS). However, the cost (in terms of latency) of this internode message is high compared to the rest of the IO request. To reduce this cost, the cache remembers the last access permission granted to this node for a particular page. For example, if node A requested write permission on a page once and it was granted successfully, and if node B had not requested the page, then node A would not have to send a lock request across ICS a second time. This solution works well for IO patterns that produce a majority of cache hits. However, for cache miss-heavy workloads, since the node does not have the new page in memory, it must still send a lock request to its peer node to ensure that the page is not being used.

With conventional approaches, to get around this performance limitation, an asymmetric logical unit access (ALUA) feature is used. A data volume (i.e., a named logical extent with its address space) has a notion of being "owned" by a node. Using ALUA, the initiators are advertised that all IO requests to a volume should be directed to a specific node. Once an IO request has been directed to a particular node, the cache may use the concept of an extent lock, which works similarly to the page lock. Both nodes maintain a table in memory for all the extents in the system indexed by the extent identifier. Data pages are locked as usual, but a lookup is also performed on the extent table using the extent identifier of the data page. If the peer node has not seen an IO request for a particular extent, it may grant a lock not only on the data page, but also for the entire data extent. This information is updated and maintained on the requesting node, and subsequent IO requests on that node for that extent no longer need to send lock requests through ICS to the peer node.

The scheme described above is effective in limiting the need for internode lock requests for data pages, but the main challenge of this scheme is being ineffective for metadata pages. This is because volume snapshot and clone operations may result in multiple data volumes sharing the same data, including some of the same metadata pages. Consequently, a single metadata page may belong to multiple extents. Without a reliable ID to reference the extent table, the metadata cache must send lock requests across ICS for metadata cache misses.

This means that the active/active cache suffers from a strain on the ICS infrastructure and a degradation in terms of latency of all internode messages system wide. As will be discussed in greater detail below, implementations of the present disclosure may provide a more efficient and effective method of limiting the need for internode lock requests in metadata cache for cache misses. Implementations of the present disclosure may involve using a metadata family identifier to capture a sharing relationship among related metadata pages, and the addition of a family identifier locking table. Additionally, since the family identifier may not be known until the page is load, the IO path may be changed for a metadata cache miss to first load the page before locking it. Overall, implementations of the present disclosure may improve the performance of the active/active cache by reducing the latency of metadata access through the reduction of the number of inter-node messages. This, in turn, may reduce the strain on the ICs infrastructure and have a beneficial effect on the latency of all internode messages system wide.

Figure 5:
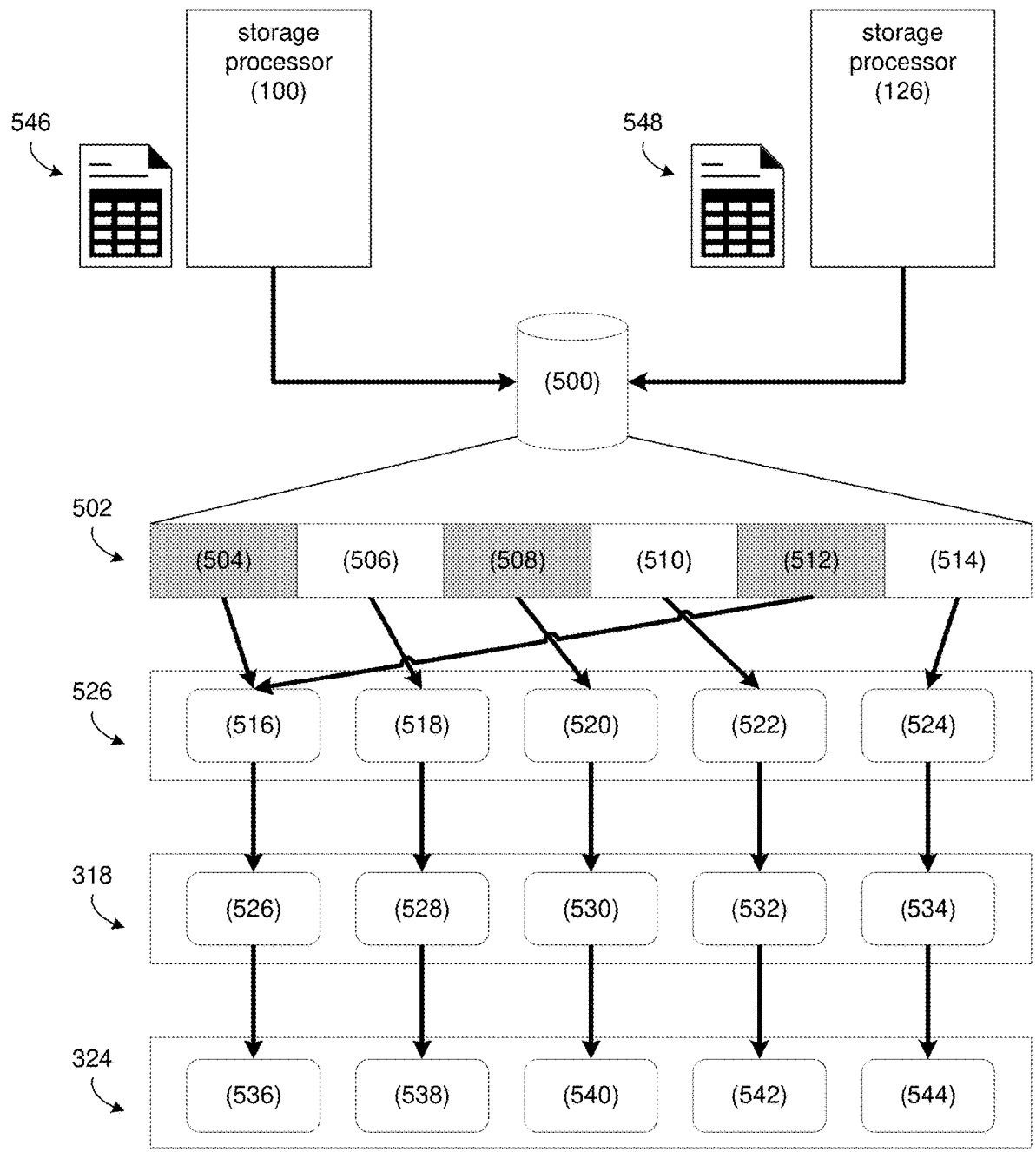
FIG. 5 is an example diagrammatic view of the storage system of FIG. 1 according to one or more example implementations of the disclosure.

In some implementations, metadata access locking process 10 may receive a metadata input/output (IO) request 400 on a first storage node of a storage system. For example, storage system 12 may include a plurality of metadata pages configured to store user data (i.e., data stored by and accessed by users of storage system 12). Metadata pages may generally include any container or storage unit configured to store data within a storage system (e.g., storage system 12). For example, a metadata page may be any one of the following: a volume (aka Logical Unit Number (LUN)), a file, or parts thereof that may be defined e.g., by offsets or address ranges (e.g., sub-LUNs, disk extents, and/or slices). Referring also to FIG. 5 and in some implementations, storage system 12 may include a plurality of metadata pages (e.g., metadata page 500) that is accessible to both storage nodes of the storage cluster (e.g., storage nodes 100, 126). In this example, metadata page 500 may include a plurality of logical metadata pages represented by logical address space (e.g., logical address space 502). Logical address space is an abstracted, logical representation of storage space within the storage system.

In this example, a storage node of the storage cluster (e.g., storage nodes 100, 126) may receive a metadata input/output (IO) request. The mapper layer may supply the start LBA, length and a family identifier to the storage node. For example, suppose metadata page 500 is a volume or slice with a predefined amount of storage space. Metadata page 500 may be organized or defined by a total amount of logical address space 502 where various portions of the logical address space may be separately addressable. For example and in some implementations, logical address space 502 may include a plurality of metadata pages (e.g., metadata pages 504, 506, 508, 510, 512, 514). Each metadata page may include a predefined amount of storage capacity (e.g., two megabytes). For example, metadata page 504 may include a capacity of e.g., two megabytes with a logical address of O megabytes to two megabytes. Similarly, metadata page 504 may include two megabytes of logical address space with a logical address of 2 megabytes to four megabytes. In this manner, each of metadata pages 504, 506, 508, 510, 512, 514 may be separately accessible.

In some implementations, metadata access locking process 10 may partition 402 the metadata IO request into a plurality of metadata pages. The plurality of metadata pages may include a plurality of logical metadata pages and a plurality of virtual metadata pages. For example, in some storage system applications (e.g., Dell EMC Powestore®), the mapper tree is responsible for maintain all the metadata needed to service data path IO. The mapper tree has several different kinds of metadata, including logical and virtual pages, for this purpose. The logical metadata pages represent the logical space of the volume, while the virtual metadata pages represent the mapping of the data between its logical address and length, and its physical location and length on the persistent storage.

In addition, in some implementations, metadata access locking process 10 may divide logical address space 502 into a first set of metadata pages (e.g., metadata pages 504, 508, 512 (shown in FIG. 5 with shading)) and at least a second set of metadata pages (e.g., metadata pages 506, 510, 514 (shown in FIG. 5 without shading)). As will be discussed in greater detail below, each set of metadata pages may correspond to a particular storage node within the storage cluster. In some implementations, dividing 400 logical address space 502 into two sets may include defining or receiving a metadata page size and/or a total amount of metadata pages for each set. In one example, metadata access locking process 10 may divide logical address space 502 equally into the two sets of metadata pages. In another example, metadata access locking process 10 may divide logical address space 502 unequally into the two sets of metadata pages (i.e., where one set of metadata pages has more or fewer metadata pages). In some implementations, the amount of logical address space for each metadata page may be equal for each set of metadata pages. For example and as shown in FIG. 5, even logical address spaces are divided into the first set of metadata pages while odd logical address spaces are divided into the second set of metadata pages. However, metadata access locking process 10 may divide logical address space 502 into any number of sets of metadata pages (i.e., at least a second metadata page) for any number of storage nodes in the storage cluster. For example, for three storage nodes, metadata access locking process 10 may divide logical address space 502 into three set of metadata pages. As such, it will be appreciated that any number of sets of metadata pages may be defined by dividing logical address space 502 for any corresponding number of storage nodes in the storage cluster.

In some implementations, the one or more metadata objects associated with the first set of metadata pages and the at least a second set of metadata pages may include one or more mapper metadata tree objects and one or more virtual layer blocks. For example, a metadata object may generally include a non-physical data container that is used to map the metadata pages to other non-physical data containers or physical data containers or blocks. As discussed above concerning FIG. 3, metadata access locking process 10 may use various layers of metadata objects to abstract physical blocks or other portions of physical storage space into various logical representations for various purposes. For example, the one or more metadata objects may include mapper metadata tree objects such as top-level mapping page 302, mid-level mapping page 308, leaf mapping page 314, and/or virtual layer block 320.

Referring again to FIG. 5, each metadata page of logical address space 502 may map to, or may be associated with, one or more metadata objects. For example, metadata mid-level mapping pages, and/or leaf mapping pages represented in FIG. 5 by mapper metadata tree objects 516, 518, 520, 522, 524 of mapper metadata tree 526. Similarly, metadata page 504 may map to mapper metadata tree object 516; metadata page 506 may map to mapper metadata tree object 518; metadata page 508 may map to mapper metadata tree object 520; metadata page 510 may map to mapper metadata tree object 522; and metadata page 514 may map to mapper metadata tree object 524. In some implementations, each storage node may maintain its own mapper tree.

As will be described in greater detail below, mapper metadata tree object 516 may map to virtual layer block 526; mapper metadata tree object 518 may map to virtual layer block 528; mapper metadata tree object 520 may map to virtual layer block 530; mapper metadata tree object 522 may map to virtual layer block 532; and mapper metadata tree object 524 may map to virtual layer block 534. Additionally, virtual layer block 526 may map to or point to physical layer block 536; virtual layer block 528 may map to or point to physical layer block 538; virtual layer block 530 may map to or point to physical layer block 540; virtual layer block 532 may map to or point to physical layer block 542; and virtual layer block 534 may map to or point to physical layer block 544.

In some implementations, metadata access locking process 10 may obtain 404 a family identifier for each logical metadata page. The family identifier is a unique identifier assigned to a group of related metadata elements that share data and is stored in a family identifier locking table. The mapper tree may maintain the family identifier for each logical metadata page, which is stored with the metadata page on the disk and loaded into the memory when read. For example, if a volume snapshot is taken for a particular volume, all user data between the volume and its snapshot are identical. Therefore, all the logical metadata of these two elements should have the same family identifier. For all metadata IO to the logical metadata pages, the mapper tree supplies the start LBA, the length, and the family identifier. In some implementations, metadata access locking process 10 may indicate 410 that an associated family identifier does not exist for the plurality of virtual metadata pages. For example, for the metadata IO to metadata pages, such as the virtual metadata pages, which do not have an associated family identifier, a special value is used to indicate the family identifier does not exist.

Referring again to FIG. 5, suppose metadata page 504 includes, or maps to, mapper metadata tree object 516 which maps to virtual layer block 526 which maps to physical layer block 536. Now suppose that metadata page 512 is part of a volume snapshot of metadata page 504. In this example, metadata page 512 maps to mapper metadata tree object 516 which maps to virtual layer block 526 which maps to physical layer block 536. Accordingly, metadata pages 504 and 512 have the same family identifier.

In some implementations, metadata access locking process 10 may define a family identifier locking table on each storage node. For example, a family identifier locking table (e.g., family identifier locking table 546 for storage node 100 and family identifier locking table 548 for storage node 126) may include a hash table to keep track of the negotiation of locked logical metadata pages. In some implementations, the table is indexed by family identifiers. Each table entry may include a local timestamp, a remote timestamp, a sequence number, a generation number, a state, and an access level. In one example, the state may be used to indicate if a family identifier is locked by a storage node, or if locking is being done on a metadata page by metadata page basis. In some implementations, the access level is used to indicate if a family identifier is locked exclusively, mean by this storage node only, shared, meaning for read access only, or is currently locked by the other storage node. The local and remote timestamps may be used to make decisions about when to give exclusive access to a particular storage node. The sequence number increases every time the state of the family identifier record changes. The generation number may be used to indicate when lock per page, if the storage node can trust the per-page locking information. It may be incremented every time a new entry is added, or the family identifier lock is given to the other node.

In some implementations, metadata access locking process 10 may include the flow of data or the metadata IO in the cache as follows:
1. Start a transaction.
2. For each IO:
   A). Look up the pages in the transaction.
   B). For pages not found in the transaction:
      i). Look up or add the pages to cache.
      ii). Lock the pages.
      iii). Load the page data from disk into memory as needed.
      iv). Copy the data from a host buffer to a data buffer for a write IO request or copy the data buffer to the host buffer for a read IO request.
3. Abort or commit the transaction.

In some embodiments, page locking is done before loading because an IO request may be issued on pages from either cache node. The lock prevents the metadata page data from being changed while the load is occurring because any write request on the other node would also need to acquire the lock. Without the lock, reading the metadata form the disk may race with the metadata being modified, resulting in stale metadata being loaded.

However, in cases where the family identifier is unknown, locking the metadata page may result in an internode lock request being sent to the peer node, which is the specific case the system is trying to avoid if possible. Therefore, for this example, the metadata page may: 1) load into the memory, 2) obtain the family identifier, and 3) lock the metadata page using the family identifier to avoid an internode peer lock request. In some embodiments, in rare cases where reads and writes to the metadata page with the unknown family identifier are racing between the nodes, the loaded metadata pages may be stale. In this case, the load may need to be retired after locking. In cases, where the family identifier does not exist, the IO flow proceeds the usual way with locking occurring before loading and inter-node messages exchanged as usual.

In some implementations, metadata access locking process 10 may lock 406 at least one of the plurality of metadata pages from access by a second storage node using the family identifier. For example, in some implementations, metadata access locking process 10 may perform 412 an extent lock table lookup and an extent locking using the family identifier in place of an extent identifier. In particular, if the family identifier is known, the cache may perform an extent lock table lookup and an extent locking using the family identifier in place of the extent identifier.

Figure 6:
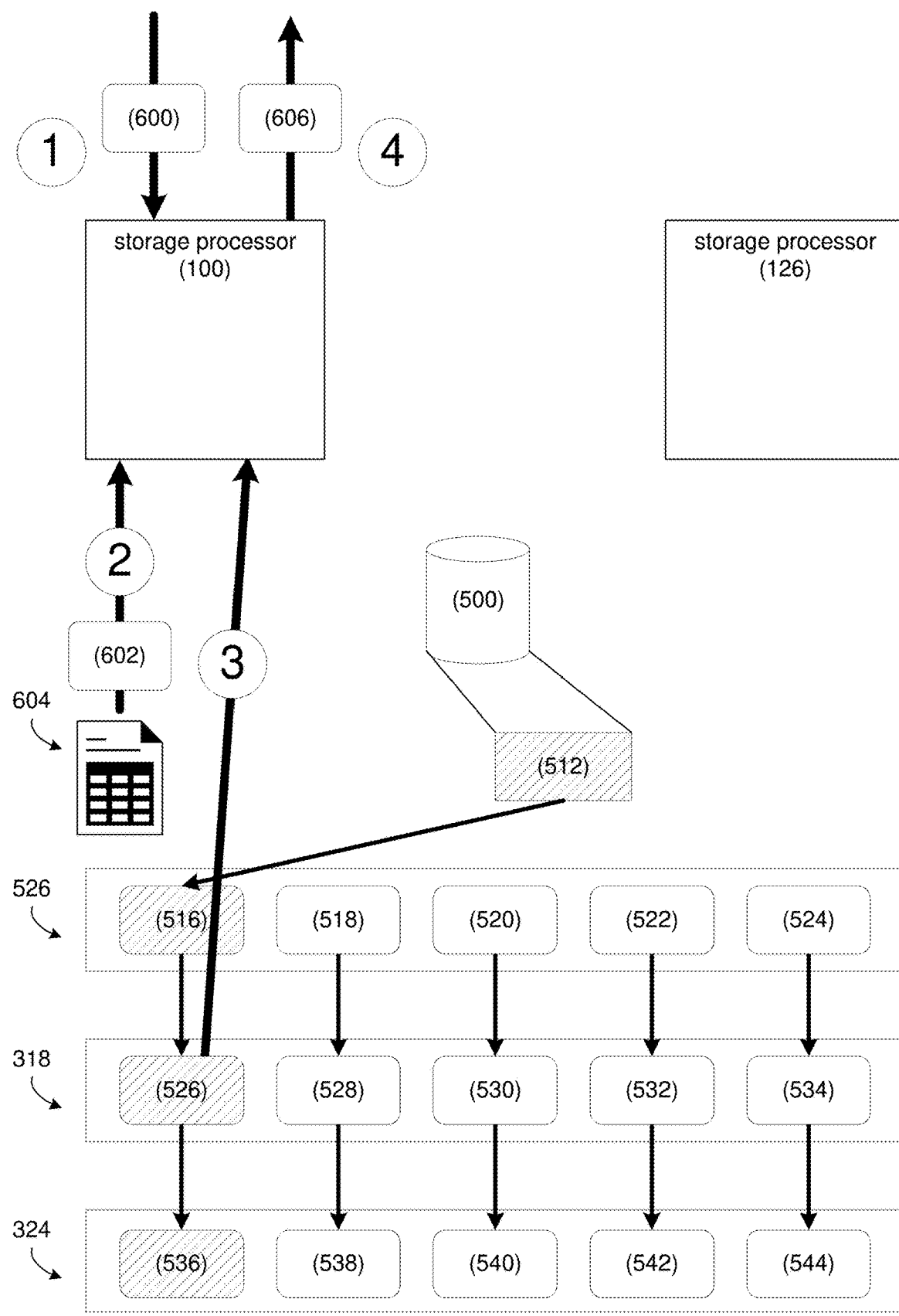
FIGS. 6 and 7 are example diagrammatic views of the metadata access locking process of FIG. 1 according to one or more example implementations of the disclosure. Like reference symbols in the various drawings indicate like elements.

For example and referring also to FIG. 6, suppose metadata access locking process 10 receives 400 a metadata IO read request (e.g., metadata IO read request 600) from a host at storage node 100. Metadata access locking process 10 may partition 402 metadata IO read request 600 into a plurality of metadata pages. In this example, metadata IO read request 600 may include a reference to a particular logical metadata page (e.g., logical metadata page 512). Receiving and partitioning metadata IO read request 600 into a plurality of metadata pages (e.g., logical metadata page 512) is shown in FIG. 6 as action "1". Metadata access locking process 10 may obtain a family identifier (e.g., family identifier 602) for logical metadata page 512 from a family identifier locking table (e.g., family identifier locking table 604) by performing 412 an extent lock lookup. In this example, because family identifier 602 is known, metadata access locking process 10 may use family identifier 602 on each storage node differently. For example, for the locking side (e.g., storage node 100), metadata access locking process 10 looks up family identifier 602. If the state is "family identifier locked" and the access is "exclusive", no locking message needs to be sent to the other storage node (e.g., storage node 126) and metadata access locking process 10 may lock 406 metadata page 512 from access by storage node 126 using family identifier 602. In this example, because family identifier locking table 604 included an entry for family identifier 602 indicating that family identifier is locked for exclusive access by storage node 100, no lock messages are exchanged between storage node 100 and storage node 126. This is shown in FIG. 6 as action "3". A response (e.g., response 606) to IO request 600 may be provided as shown in FIG. 6 as action "4".

Figure 7:
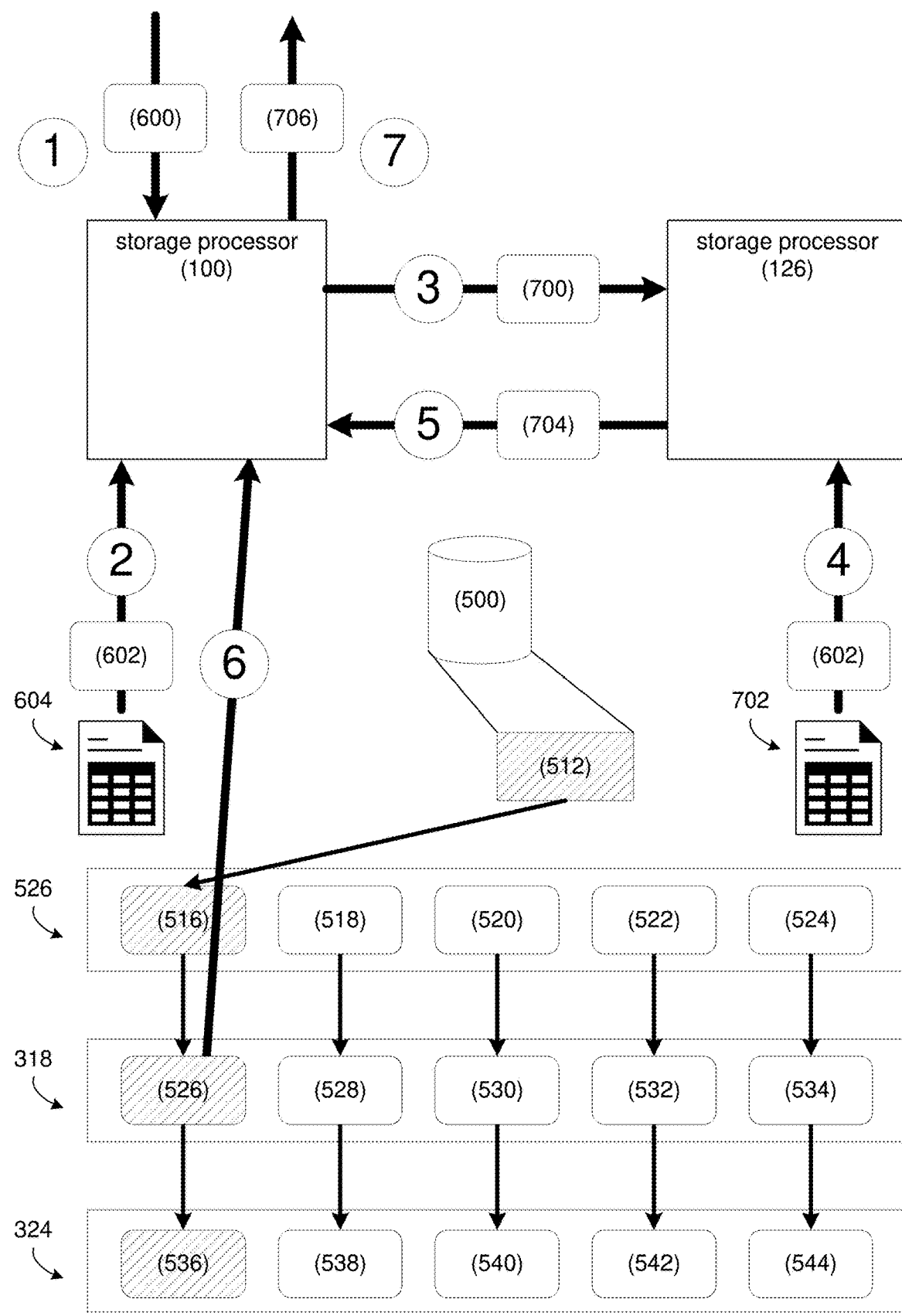

Referring also to FIG. 7, now suppose that the state of the entry is "metadata page locked". In this example, the entry's generation number is compared to the generation number saved on the metadata page (e.g., metadata page 512). If the generation numbers match, the locking information for metadata page 512 is identified. A locking message may be sent to the other storage node (e.g., storage node 126) using the internode connection service. However, if the generation numbers do not match, a locking message is sent to the peer storage node. For example, metadata access locking process 10 may send locking message 700 to storage node 126 using the internode connection service. This is shown in FIG. 7 as action "3". When storage node 126 receives a locking request from its peer for a metadata page, the first thing it does is look up the family identifier entry in its corresponding family identifier locking table (e.g., family identifier locking table 702). This is shown in FIG. 7 as action "4". If an entry does not exist, one is not added and a reply (e.g., reply 704) is immediately sent granting the lock for family identifier 602 to storage node 100. This is shown in FIG. 7 as action "5". In response to receiving reply 610 from storage node 126, metadata access locking process 10 may lock 406 metadata page 512 from access by storage node 126 using family identifier 602. This is shown in FIG. 7 as action "6". Metadata access locking process 10 may process 408 metadata IO request 600 on metadata page 512 by loading metadata page 512 into a memory (e.g., a cache or buffer) of storage node 100. A response (e.g., response 706) to IO request 600 may be provided as shown in FIG. 7 as action "7".

If an entry is found in corresponding family identifier locking table 702 and the state is "family identifier locked" and the access is "none", reply 704 is immediately sent by storage node 126 granting a lock for family identifier 602 to storage node 100. If an entry is found in corresponding family identifier locking table 702 and the state is "family identifier locked" and the access is "exclusive", the state is changed to "metadata page locked" for metadata page 512 and the access to "none". In this example, per-metadata page locking is done as normal.

Referring again to action "2" in FIG. 7, suppose that an entry in family identifier locking table 604 for family identifier 602 is found but its state is "family identifier locked" and the access is "none", the entry state is changed to "metadata page locked" and metadata access locking process 10 sends locking message 700 to storage node 126 to lock metadata page 512 and the process continues as described above and as shown in FIG. 7.

In some implementations, metadata access locking process 10 may perform 414 metadata page locking by sending a lock request and processing a lock reply using an internode connection service (ICS) when the family identifier does not exist. For example, if the family identifier does not exist, the page locking may be performed as usual as explained above.

In some implementations, metadata access locking process 10 may perform 416 a cache lookup for the at least one of the plurality of metadata pages by logical block addressing (LBA) when the family identifier is unknown. For example, if the family identifier is unknown, the cache lookup may be performed for the metadata page by the LBA. In some implementations, metadata access locking process 10 may determine 418 whether the page is loaded in the memory of the first storage node. In some implementations, metadata access locking process 10 may, in response to determining that the page is loaded in the memory of the first storage node, obtain 420 from a metadata memory structure (e.g., an in-memory metadata page state). For example, on a cache hit and if the metadata page is loaded in the memory, the mapper tree may be called to get the family identifier from the in-memory metadata page state.

In another example, metadata access locking process 10 may, in response to determining that the page is not loaded in the memory of the first storage node, read 422 the at least one of the plurality of metadata pages from persistent storage. In some implementations, metadata access locking process 10 may load 424 the at least one of the plurality of metadata pages to the memory of the first storage node. For example, on a cache miss or if the page is unloaded in the memory, a load request may be issued to the mapper tree to read the metadata page form the disk and load the metadata page to the memory. In addition, the mapper tree may be called to get the family identifier from the in-memory metadata page state. Using the family identifier obtained from the in-memory page data, the extent lock table lookup and the extent locking may be performed using the family identifier in place of the extent identifier, as explained above.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods, and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a metadata input/output (IO) request on a first storage node of a storage system;
   partitioning the metadata IO request into a plurality of metadata pages, wherein the plurality of metadata pages include a plurality of logical metadata pages and a plurality of virtual metadata pages;
   determining that a family identifier for each logical metadata page is known, wherein the family identifier is a unique identifier assigned to a group of related metadata elements that share data, and is stored in a family identifier locking table;
   locking, using the family identifier, at least one of the plurality of metadata pages from access by a second storage node, wherein locking the at least one of the plurality of metadata pages includes performing an extent lock table lookup and an extent locking using the family identifier in place of an extent identifier; and
   processing the metadata IO request on the plurality of metadata pages by loading the at least one of the plurality of metadata pages into a memory of the first storage node.

2. The computer-implemented method of claim 1, wherein determining that the family identifier for each logical metadata page is known includes indicating that an associated family identifier does not exist for the plurality of virtual metadata pages.

3. The computer-implemented method of claim 1, wherein the first and second nodes of the storage system are configured in an active/active configuration.

4. A computer program product residing on a non-transitory computer readable storage medium having a plurality of instructions stored thereon which, when executed across one or more processors, causes at least a portion of the one or more processors to perform operations comprising:
   receiving a metadata input/output (IO) request on a first storage node of a storage system;
   partitioning the metadata IO request into a plurality of metadata pages, wherein the plurality of metadata pages include a plurality of logical metadata pages and a plurality of virtual metadata pages;
   determining whether a family identifier for each logical metadata page exists, wherein the family identifier is a unique identifier assigned to a group of related metadata elements that share data, and is stored in a family identifier locking table;
   locking, using the family identifier, at least one of the plurality of metadata pages from access by a second storage node, wherein locking the at least one of the plurality of metadata pages includes performing an extent lock table lookup and an extent locking using the family identifier in place of an extent identifier when the family identifier is known; and
   processing the metadata IO request on the plurality of metadata pages by loading the at least one of the plurality of metadata pages into a memory of the first storage node.

5. The computer program product of claim 4, wherein locking the at least one of the plurality of metadata pages includes performing metadata page locking by sending a lock request and processing a lock reply using an internode connection service (ICS) when the family identifier does not exist.

6. The computer program product of claim 4, wherein locking the at least one of the plurality of metadata pages includes performing a cache lookup for the at least one of the plurality of metadata pages by logical block address (LBA) when the family identifier is unknown.

7. The computer program product of claim 6, wherein performing the cache lookup for the metadata page by the LBA includes:
   determining whether the page is loaded in the memory of the first storage node,
   in response to determining that the page is loaded in the memory of the first storage node, obtaining the family identifier from a metadata memory structure, and
   in response to determining that the page is not loaded in the memory of the first storage node:
      reading the at least one of the plurality of metadata pages from persistent storage, and
      loading the at least one of the plurality of metadata pages to the memory of the first storage node.

8. The computer program product of claim 4, wherein determining whether the family identifier for each logical metadata page exists includes indicating that an associated family identifier does not exist for the plurality of virtual metadata pages.

9. The computer program product of claim 4, wherein the first and second nodes of the storage system are configured in an active/active configuration.

10. A computing system including one or more processors and one or more memories configured to perform operations comprising:
   receiving a metadata input/output (IO) request on a first storage node of a storage system;
   partitioning the metadata IO request into a plurality of metadata pages, wherein the plurality of metadata pages include a plurality of logical metadata pages and a plurality of virtual metadata pages;
   determining whether a family identifier for each logical metadata page exists, wherein the family identifier is a unique identifier assigned to a group of related metadata elements that share data, and is stored in a family identifier locking table;
   locking, using the family identifier, at least one of the plurality of metadata pages from access by a second storage node, wherein locking the at least one of the plurality of metadata pages includes performing an extent lock table lookup and an extent locking using the family identifier in place of an extent identifier when the family identifier is known; and
   processing the metadata IO request on the plurality of metadata pages by loading the at least one of the plurality of metadata pages into a memory of the first storage node.

11. The computing system of claim 10, wherein locking the at least one of the plurality of metadata pages includes performing metadata page locking by sending a lock request and processing a lock reply using an internode connection service (ICS) when the family identifier does not exist.

12. The computing system of claim 10, wherein locking the at least one of the plurality of metadata pages includes performing a cache lookup for the at least one of the plurality of metadata pages by logical block address (LBA) when the family identifier is unknown.

13. The computing system of claim 12, wherein performing the cache lookup for the metadata page by the LBA includes:
   determining whether the page is loaded in the memory of the first storage node,
   in response to determining that the page is loaded in the memory of the first storage node, obtaining the family identifier from a metadata memory structure, and
   in response to determining that the page is not loaded in the memory of the first storage node:
      reading the at least one of the plurality of metadata pages from persistent storage, and
      loading the at least one of the plurality of metadata pages to the memory of the first storage node.

14. The computing system of claim 10, wherein determining whether the family identifier for each logical metadata page exists includes indicating that an associated family identifier does not exist for the plurality of virtual metadata pages.

* * * * *